Sept. 18, 1956     H. L. SETZ ET AL     2,763,495
TORSION BAR FRONT SUSPENSION
Filed Feb. 7, 1955
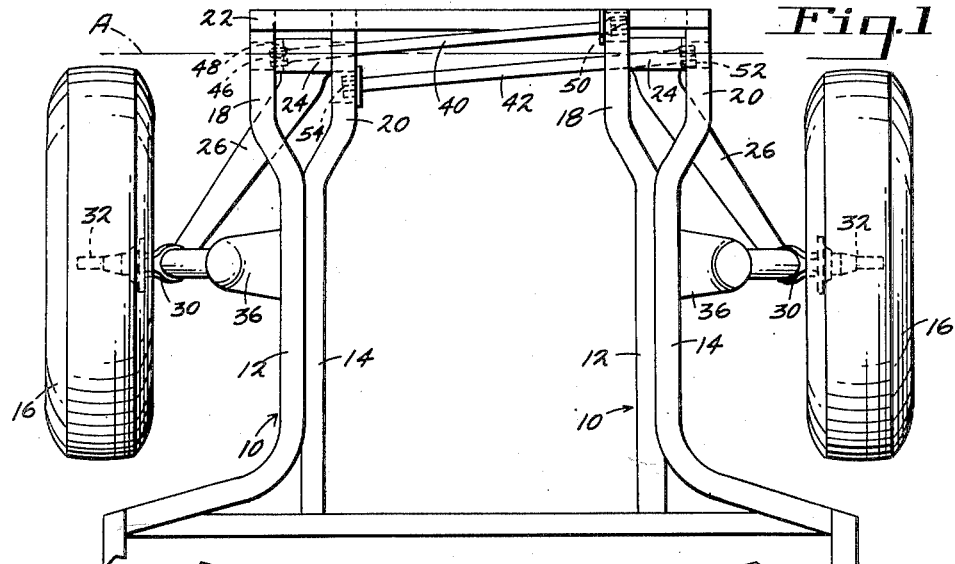
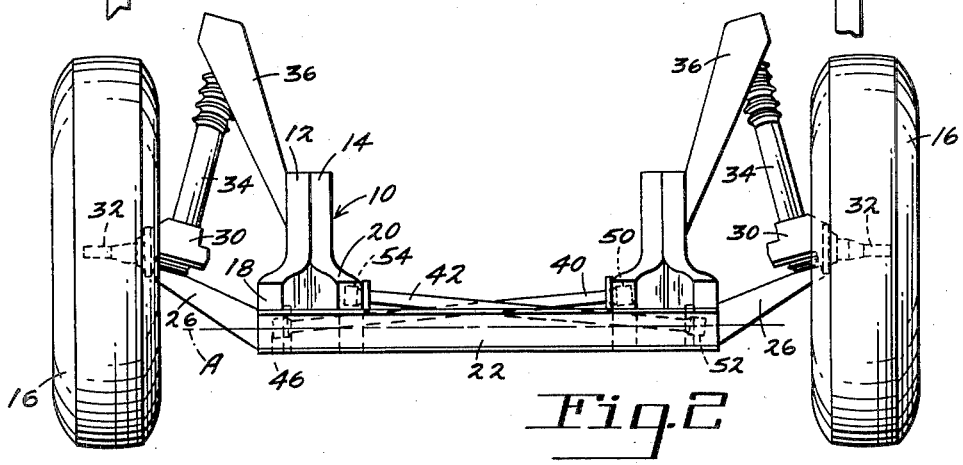
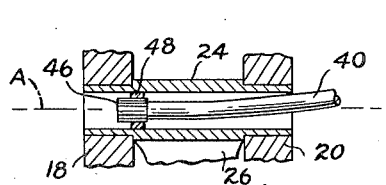
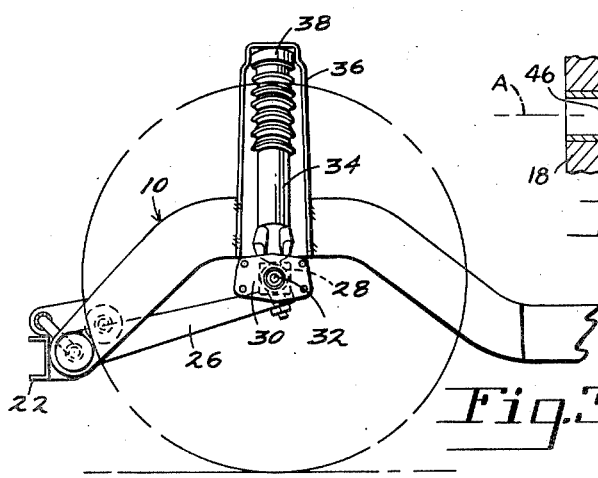
H.L. SETZ.
B.E. TOMS.
INVENTORS.
ATTYS.

United States Patent Office 2,763,495
Patented Sept. 18, 1956

2,763,495
TORSION BAR FRONT SUSPENSION

Henry L. Setz, Franklin Village, and Bruce E. Toms, Dearborn, Mich., assignors to Ford Motor Company, Dearborn, Mich., a corporation of Delaware Application February 7, 1955, Serial No. 486,652

2 Claims. (Cl. 280—124)

This invention relates generally to an independent wheel suspension for a motor vehicle, and has particular reference to an independent suspension for the front wheels of a motor vehicle incorporating a pair of torsion bars.

In an embodiment of the present invention a trailing suspension arm is provided for each of the front road wheels, being pivotally mounted upon the vehicle frame for rotation about a common transverse horizontal axis. The hubs for the suspension arms are hollow to accommodate one end of a transversely extending torsion bar, the opposite end of which is anchored to the vehicle frame at the opposite side thereof. The bars are arranged at an angle to the transverse axis of the suspension arms to provide a compact assembly yet permitting the suspension arms to be journaled upon a common transverse horizontal axis.

Other objects of the invention will be made more apparent as this description proceeds, particularly when considered in connection with the accompanying drawing, wherein:

Figure 1 is a fragmentary plan view of the forward portion of a motor vehicle chassis incorporating the torsion bar suspension of the present invention.

Figure 2 is a front end elevation of the construction shown in Figure 1.

Figure 3 is a side elevational view of the construction shown in Figure 1.

Figure 4 is an enlarged fragmentary section view illustrating the torsion bar and hub construction.

Referring now to the drawings, the reference character 10 indicates generally the side frame rails of a motor vehicle frame. Each side frame rail 10 comprises a pair of opposed channel shaped members 12 and 14 secured to each other along a portion of their length forwardly of the transverse axis of the front road wheels 16 the frame members 12 and 14 are flared outwardly with respect to each other with the forward portions 18 and 20 respectively being separated transversely and extending parallel to each other. A front cross frame member 22 joins the forward ends of the frame members 18 and 20 and is suitably welded thereto.

A pair of hollow pivot hubs 24 are provided, one at each side of the vehicle, each with its opposite ends journaled in the frame members 18 and 20. The two hubs 24 are in transverse horizontal alignment with each other along the axis A, and each is secured to the forward end of a rearwardly extending trailing suspension arm 26.

The trailing suspension arms 26 are flared outwardly with respect to the frame side rails 10, and also are inclined upwardly in a rearward direction. At their rearward ends the trailing suspension arms 26 are connected by means of ball joints 28 to spindle supports 30 having spindle portions 32 rotatably supporting the front road wheels 16.

A generally vertically extending combined hydraulic shock absorber and telescopic control member 34 is mounted upon each of the spindle supports 30, and has its upper end supported within a frame bracket 36 extending upwardly and outwardly from the frame side rail 10. The connection between the upper end of the hydraulic shock absorber 34 and the frame bracket 36 comprises a rubber mount 38 permitting slight angular movement of the shock absorber 34 as the road wheel rises and falls. Thus it will be seen that the trailing suspension arm 26 and the combined hydraulic shock absorber and telescopic control member 34 combined to support and guide the road wheel 16 during jounce and rebound movements.

A pair of torsion bars 40 and 42 form the spring suspension means for the trailing suspension arms 26. As best seen in Figure 1, the left hand end of the front torsion bar 40 extends through the hollow hub 24 of the trailing suspension arm 26 and is formed with an enlarged splined end portion 46 anchored within a partition wall 48 of the hub of the trailing suspension arm. It will be noted that the torsion bar 40 is inclined with respect to the common transverse axis A of the two trailing suspension arms 26 and at its right hand as viewed in Figure 1 is formed with an enlarged splined end portion 50 suitably anchored within the forward portion of the frame member 18 at the right hand side of the vehicle frame.

The second torsion bar 42 is identical with the front torsion bar 40 but is reversed with respect thereto, and extends through the hollow hub 24 of the right hand trailing suspension arm 26. An enlarged splined end 52 is formed on the torsion bar 42 and is anchored within the hub of the trailing suspension arm in a manner similar to the construction at the left hand trailing suspension arm. The torsion bar 42 is inclined with respect to the common horizontal transverse axis A of the trailing suspension arms 26 and its left hand end 54 is anchored within the frame member 20 at the left side of the vehicle frame at a point rearwardly of the axis A.

As viewed in the plan view shown in Figure 1, the torsion bars 40 and 42 are parallel. It will be noted, however, that as viewed in the front elevation shown in Figure 2 the arms 40 and 42 are inclined with respect to each other in opposite directions with the anchored ends 50 and 54 respectively of the bars being elevated above the common transverse horizontal axis A of the trailing suspension arm pivot. The arrangement shown permits the torsion bars 40 and 42 to be compactly arranged at the forward portion of the vehicle frame in such manner as to avoid interference with each other and yet to enable the trailing suspension arms for the front road wheels to be journaled about a common transverse horizontal axis.

It will be noted that as the front road wheels rise or fall during wheel jounce or rebound, the torsion bars connected to the respective trailing suspension arms will be torsionally stressed. Inasmuch as the axes of the torsion bars are inclined slightly with respect to the pivotal axis of the suspension arms, a small amount of bending will be introduced into the bars, but of insufficient amount to be objectionable. A universal joint used at the control arm torsion bar anchor reduces bending.

It will be understood that the invention is not to be limited to the exact construction shown and described, but that various changes and modifications may be made without departing from the spirit and scope of the invention, as defined in the appended claims.

What is claimed is:

1. In an independent wheel suspension for the front road wheels of a motor vehicle having a frame, said frame having side frame rails extending generally longitudinally of said vehicle and each comprising a pair of opposed frame members joined together during a portion of their longitudinal extent but transversely offset with respect to each other adjacent the forward portion of said vehicle frame, a transverse cross frame member joining the forward ends of the offset portions of said frame members, a suspension member at each side of said vehicle having a hollow sleeve-like hub journaled in the offset forward portions of the frame members of the adjacent side frame rail, said suspension arm having a trailing arm portion inclined outwardly and upwardly in a rearward direction with respect to said side frame rail and connected at its rearward end to said road wheel, a combined hydraulic shock absorber and telescopic control member connected at its lower end to the rearward end of said trailing arm portion of the suspension arm and at its upper end to said frame, a pair of transversely extending torsion bars one for each of said suspension arms, each of said torsion bars having one end thereof extending into the hollow hub of one of said suspension arms and anchored to said hub and the opposite end anchored to one of the frame members of the side frame rail at the opposite side of the vehicle, the ends of the torsion bars anchored to said suspension arm hubs lying horizontal axis of said suspension of the torsion bars anchored to said spaced longitudinally from said common said anchored ends being spaced forwardly of mon axis and the other spaced rearwardly thereof.

2. The structure defined by claim 1 which is further characterized in that the ends of said torsion bars are anchored to the innermost frame member of each side frame rail at points located equal distances above a horizontal plane containing the common transverse horizontal axis of said suspension arm hubs.

References Cited in the file of this patent

FOREIGN PATENTS

| 850,556 | Germany | Aug. 25, 1952 |
| 907,149 | Germany | Mar. 22, 1954 |